US009851129B1

(12) United States Patent
Tanner

(10) Patent No.: US 9,851,129 B1
(45) Date of Patent: Dec. 26, 2017

(54) IONIC AIR COOLING DEVICE

(71) Applicant: David John Tanner, Poway, CA (US)

(72) Inventor: David John Tanner, Poway, CA (US)

( * ) Notice: Subject to any disclaimer, the term of this patent is extended or adjusted under 35 U.S.C. 154(b) by 204 days.

(21) Appl. No.: 14/720,922

(22) Filed: May 25, 2015

(51) Int. Cl.
*F25B 15/00* (2006.01)
*F25B 30/06* (2006.01)
*B01D 57/02* (2006.01)

(52) U.S. Cl.
CPC .............. *F25B 30/06* (2013.01); *B01D 57/02* (2013.01)

(58) Field of Classification Search
CPC .......... F25B 15/00; F25B 30/06; F25B 37/00; B01D 57/02
USPC .......................................................... 62/476
See application file for complete search history.

(56) References Cited

U.S. PATENT DOCUMENTS 9,677,809 B1 * 6/2017 Eustis .................. F25D 31/002

* cited by examiner

*Primary Examiner* — Len Tran
*Assistant Examiner* — Ana Vazquez
(74) *Attorney, Agent, or Firm* — Michael D. Eisenberg

(57) ABSTRACT

An ionic air cooling device comprising a salinity differential heat engine using a heat pump as the primary heat source and the mechanism by which the temperature differential is achieved. A closed loop thermodynamic cycle which produces a high thermodynamic efficiency in heat to energy conversion with a low temperature differential between the high and low sides, in addition to a net ambient temperature cooling effect by directly or indirectly converting ambient temperature/environmental low grade heat to electricity or potential kinetic energy or mechanical work. An ionic air cooling device which uses a salinity differential heat engine in which the heat energy can be converted to kinetic or electrical energy by means of pressure retarded osmosis, pressurized gas through volume confinement, or reversed electro dialysis.

9 Claims, 8 Drawing Sheets

IONIC AIR COOLING DEVICE

TECHNICAL FIELD

The present invention, in some embodiments thereof, relates to air cooling systems and devices.

BACKGROUND OF THE INVENTION

It is well known in the prior art, electrical energy may be generated from the "free" energy produced by the mixing of two ionic solutions by a reversed-electro-dialysis or pressure retarded osmosis (PRO) processes. This process utilizes two ionic solutions of differing concentrations and temperature ranges, passing the solutions through a Reversed-Electro-Dialysis membrane stack, the dilute and concentrated solutions entering on either side of the membrane layer, causing solute to pass from the concentrated side to the dilute side, creating the generation of an electrical output across the electrodes located at either end of the membrane stack. The resulting electrical output is a function, generally speaking, of the difference in the concentrations of the inputted solutions, the type of salts utilized and the corresponding enthalpy of solution of a particular salt, and the characteristics of the membrane and electrodes utilized including the number of membrane cell units.

In the case of large supplies of available aqueous solutions, such as seawater and municipal fresh water supplies, reserved-electro-dialysis ("RED") or pressure retarded osmosis factories constructed require a continual replenishment of ionic solutions used to conduct their salinity-gradient processes, causing the need to discharge of spent brine into the environment. The solution sources in most RED systems utilize natural fresh water sources (such as rivers) and natural saltwater sources (such as the ocean, or a salt water lake) these sources of solution contain impurities that damage and reduce the efficiency of the RED system's membrane stacks or in the case of pressure retarded osmosis, these impurities cause fouling of the membranes. This situation limits the overall efficiencies of such an open-ended, reversed-dialysis system.

Modifications have been developed to address the limitations of such an open system design, including, for example, Loeb, U.S. Pat. No. 4,171,409, Oct. 16, 1979. Loeb designed a contained or closed system, eliminating the need to continually replenish the ionic solution inputs, as well as eliminates the need to dispose of discharged outputs. Yet the wattage and power density of the ionic solution per unit volume generated by Loeb's system is low due to various factors including the temperature ranges preferred by Loeb. (T-high 100 degrees C./T-low 25 degrees C., resulting voltage 0.170 watts/m2 in a 0.57 NACL aqueous solution. FIG. 3)

Other factors effecting the efficiency of a reversed-dialysis system like Loeb's, include the type of ionic compounds selected; the state of the art and type of membranes and electrodes selected including the types of shuttle carriers used within the electrode units (the rinse solution); whether or not a single separator or thermal unmixing unit (processing tank) is utilized; the shapes, design and materials comprising such processing tanks and their corresponding entry pipettes; the use of various shapes, designs and materials of heat exchangers and manifold systems; the use of one or more buffering tanks; the use of a compressor refrigerant cycle (heat pump as a heat source) and the capture and absorption of ambient air heat supplies back into the contained system; and the use more than one RED unit, using a thermodynamically opposed solution all may be utilized to create further efficiencies.

What is needed is an efficient contained ionic salt-gradient system which is able to make a significant supply contribution to the existing electrical power markets, in particular, performing an air cooling function so as to limit the heat foot print heat energy of manufacturing, especially of energy manufacturers.

BRIEF SUMMARY OF EMBODIMENTS OF THE INVENTION

An object of the present invention is to provide a method and apparatus using highly efficient means to generate air cooling.

Another object of the invention is to improve and extend the utility of the reversed-electro-dialysis processes, in addition to the pressure retarded osmosis process, according to the method and apparatus disclosed herein creating a highly efficient electrical output that has a very low carbon footprint—e.g. it is not reliant on consumption of fossil fuels, thus avoiding the production of greenhouse gas emissions. To the extent the invention disclosed herein causes net air cooling, its utility in the reduction of greenhouse gases could be especially useful.

A further object of this invention is to associate the disclosed method and apparatus with an industrial low grade heat source, such as the gasification of municipal solid waste, solar, or a gas stream input from for example a petroleum cracking facility, allowing the electrical voltage potential created by this contained ionic gradient system to be applied to the cooling of the ambient air within the system or factory, thus producing a discharge of the amount of cool air created by a system producing 1 megawatt/minute of electrical power output for 52 a gallon system.

A final object of the invention is to devise a system improving the ionic fluid dynamics within the contained system, so as to speed-up or increase the rate of ionic flow through a given system, without changing the amount of fluids contained within the system.

According to one aspect of the present invention, there is provided a method of generating air cooling comprising: Releasing an intermediate ionic solution from at least one buffering tank into two equal volume yet separate processing tanks associated with a heat pump, generating a hot-side concentrated ionic solution at a temperature range no less than 140 degrees F. in a processing tank designated the dissolving tank, associated with at least one of heat exchangers, automatic-flow-valves, heat pumps, and passing this concentrated solution through a reversed-electro-dialysis unit or pressure retarded osmosis unit; generating a cold-side, diluted ionic solution from the processing tank designated the precipitating tank utilizing a reversible-vapor-compression pump with a coefficient of performance of at least 3 or above generated at a temperature no less than 33 degrees F., in a processing tank associated with at least one of heat exchangers, automatic-flow-valves, and reversible-vapor-compression pumps, and passing this diluted solution through a reversed-dialysis unit or pressure retarded osmosis system; reconstituting said concentrated and diluted ionic solutions into an intermediate solution before exiting from the reversed-dialysis unit or pressure retarded osmosis system; and recycling the intermediate ionic solution by performing the previous three steps in a contained system.

According to another aspect of the present invention, there is provided an ionic air cooling device comprising:

releasing an intermediate ionic solution from at least one buffering tank associated with a pump, generating a hot-side concentrated ionic solution at a temperature range no less than 140 degrees F. in a processing tank, associated with at least one of heat exchangers, automatic-flow-valves, heat pumps, and passing this concentrated solution through a reversed-dialysis unit; releasing an intermediate ionic solution from at least one buffering tank associated with a pump, into two processing tanks, one of which generating a cold-side (precipitating tank), diluted ionic solution and a hot-side concentrated ionic solution utilizing a reversible-vapor-compression pump with a coefficient of performance of at least 3 or above generated at a temperature no less than 33 degrees F., in a processing tank associated with at least one of heat exchangers, automatic-flow-valves, and reversible-vapor-compression pumps, and passing this diluted solution through a reversed-dialysis unit; reconstituting said concentrated and diluted ionic solutions into an intermediate solution before exiting from the reversed-dialysis unit; and recycling the ionic solution by performing steps earlier three steps in a contained system.

Said method and apparatus describes a highly efficient electrical current source created by a contained, or closed salient-gradient fluid system connected to ambient air sources by means of heat exchangers and heat pumps capable through the above described steps of generating 1 megawatt/min for a 52 gallon system.

The present invention has advantages over prior art in the reduced preferred temperature ranges between the ionic solutions; the use of at least one buffering tank; the use of two or more processing tanks—which may vary in shape and design as well as be insulated according to preferred temperature ranges; the use of a set of intermediate ionic solution pathways; the selection of high valence temperature specific salts such as Silver-Nitrate ($AgNO_3$) and Ammonium-Nitrate ($NH_4NO_3$); and the use of at least one automatic-flow-valve from the buffering tank allowing this tank to fill before emptying into the two or more processing tanks, further allowing the processing tanks to be switched back and forth from cold-side diluted to hot-side concentrated, causing precipitated sediments to be recycled by dissolving into the hot-side solution, wherein there is no net loss in the electro-chemical cycle. Preferred ranges for this invention are 440 g/100/g/mol. At 150 degrees F. and 122 g/100 g/mol. at 33 degrees F. Utilization of cathode-anode membranes of preferred thickness and cell number such as Fumasep models fks 30, fad 30 or fab 30, obtained from obtained from manufacturer FUMATECH GmbH, create further efficiencies over the prior art. Also utilized in this invention are electrode units coated with iridium oxides or titanium-niobium, further utilizing $K_4Fe(CN)_6$ and $K_3FE(CN)_6$ (Potassium-Iron II & III Hexacyonaferrates) as electrode rinsing solutions creating further efficiencies for this invention. Utilization of heat exchangers of various sizes and shapes, as well as gold plating over copper creating additional efficiency advantages for this invention, as well as preventing corrosion.

In order to conserve energy the method and resulting apparatus may include the use of an external industrial heat source input, instead of relying solely upon the absorption of ambient air heat sequestered from the heat exchangers used by the heat pump to create the temperature differential of the system so as to create additional efficiency advantages. By using industrial heat source input by an industrial process exceeding the operational temperature of the heat pump (140-150 degrees Fahrenheit), the system is able to increase the concentration of solute on the hot side, further increasing the salinity differential between hot and cold sides which corresponds to an increase in power density of the ionic solution. Energy is further conserved through the disclosed use of an underlying processing tank sediment drain activated by an automatic-flow-valve, pumped towards the hot-side of the system at or above 140 degrees F., causing the sediment created on diluted cold-side, to be reabsorbed by the hot-side concentrated ionic solution using heat from processes that produce heating at higher than 140 degrees F., as in heat sources other than a heat pump absorbing heat from the ambient air, an example of this could be concentrated sunlight, or various industrial processes.

Additional RED/PRO units may be added, which may be contained in separate systems solutions of opposing enthalpies of solution, and separate electrode rinse cycles. Or the additional RED units may be configured in the same contained system utilizing the same solution constituents and electrode rinse cycle.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION OF THE EMBODIMENTS OF THE INVENTION

From time-to-time, the present invention is described herein in terms of example environments. Description in terms of these environments is provided to allow the various features and embodiments of the invention to be portrayed in the context of an exemplary application. After reading this description, it will become apparent to one of ordinary skill in the art how the invention can be implemented in different and alternative environments.

Unless defined otherwise, all technical and scientific terms used herein have the same meaning as is commonly understood by one of ordinary skill in the art to which this invention belongs. All patents, applications, published applications and other publications referred to herein are incorporated by reference in their entirety. If a definition set forth in this section is contrary to or otherwise inconsistent with a definition set forth in applications, published applications and other publications that are herein incorporated by reference, the definition set forth in this document prevails over the definition that is incorporated herein by reference.

Figure 1:
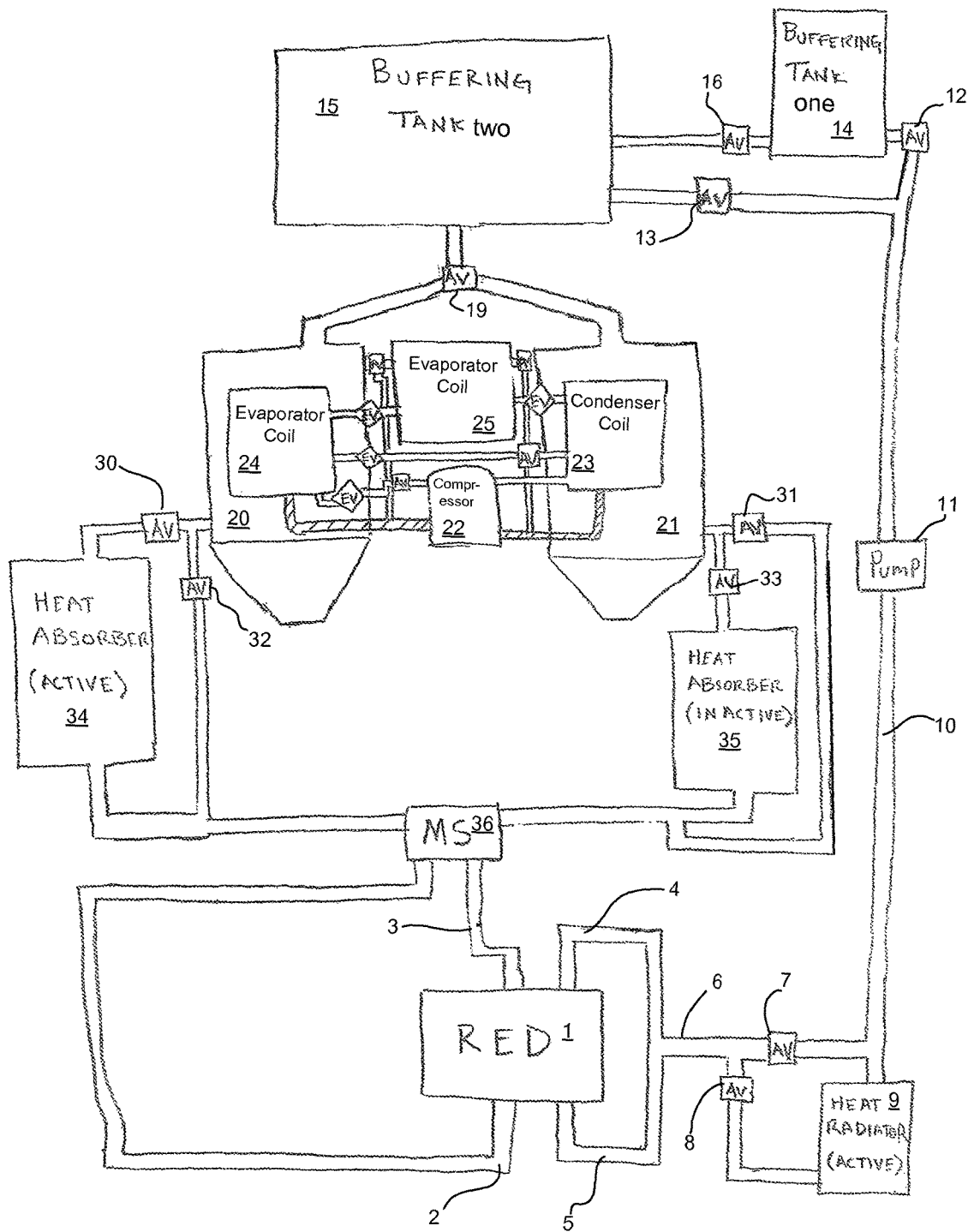
FIG. 1 illustrates the generalized concept and features of the method and apparatus of this invention.

With reference to FIG. 1, illustrating the generalized concept of generating a highly efficient method of air cooling, an embodiment of the present invention utilizes a contained ionic fluid system with a reversed-electro-dialysis (RED) or pressure retarded osmosis (PRO) unit (1), with two entry lines, one of hot-concentrated (2) and one cold diluted (3), and one or two exit lines (4, 5) joining to one exit line (6), which moves the intermediate solution to a valve series (7, 8) that may or may not pass said liquid through a radiator (9) to cool liquid to atmospheric temperature by removing excess heat, passing through a line after the radiator valve series (10) to a liquid pump (11) into a valve series (12, 13) which directs the intermediate solution into one of two buffering tanks (14, 15), when buffering tank one (14) is not bypassed. Buffering tank one acts as a holding tank for incoming fluid from the RED/PRO until buffering tank two (15) has completely drained its contents into both processing tanks (20, 21), at which point buffering tank one is bypassed, buffering tank two continues to accept intermediate solution from the RED, and buffering tank one drains its contents into buffering tank two via automatic valve (16) and pump (11) while buffering tank two, simultaneously receives intermediate solution from buffering tank one bypass line and automatic valve (13). When the buffering tank two (15) is completely full of intermediate solution, buffering tank one bypass line and automatic valve (13) is deactivated (closed), while automatic valve (12) is activated (open) and intermediate solution begins to fill buffering tank one, buffering tank two drains its contents via automatic valves (19, 18) or (19, 17). 50 percent of solution moves through a radiator to decrease solution temperature to ambient environmental temperature (18), and this solution will next enter the processing tank designated the cold-side precipitating tank (20). The additional 50 percent of intermediate solution bypasses radiator (17) and moves through radiator bypass valve (19). As this solution will be received by the processing tank designated the hot-side dissolving tank, the added heat not dissipated to the ambient will be used to dissolve the salt in the concentrated solution hot-side dissolving tank (21). After both processing tanks are completely filled via the buffering tank, the heat pump is activated. Referring to FIGS. 1 and 2, 2a-2d, the heat pump is comprised of a refrigerant compressor (22), a condenser coil (23), through which refrigerant and heat is transferred to the liquid in the hot side dissolving tank, an expansion valve (50a, 50b, 50c, 50d) through which refrigerant cooled by the liquid in the dissolving tank is moved to the evaporator coil, and an evaporator coil (24) where heat is removed from the cold-side precipitating tank and transferred by the refrigerant to the compressor (22) to the condenser which radiates this heat to hot-side dissolving tank (21). After the temperature of the cold-side precipitating tank (20) has been reduced to approximately 32 degrees F. from 72 degrees starting ambient temp, (37 degree change) and the condenser coil has increased the hot side dissolving tank from 80 degrees (approximate) to 95 degrees (a 15 degree change), a heat pump with a coefficient of performance of 4.5 will begin to suffer efficiency losses if the temperature differential is to increase beyond 68 degrees; to combat this loss, the evaporator coil in the cold side tank (20) is bypassed and heat from the air (72 degrees) is used to heat the dissolving tank (21) using the external evaporator coil (25) to increase the dissolving tank temperature from 95 F to 140 F while the cold side remains at 32 F. In so doing, the heat pump maintains a lower temperature differential between hot and cold sides, which positively influences heat pump efficiency, as efficiency of a heat pump is equal to the reciprocal of the efficiency of a heat engine. At the beginning of the first heat pump cycle, the cold side solution is ambient temperature of 72 degrees F., and the hot side (because it bypassed radiator (17)) is slightly warmer, approximately 80 degrees. By the end of the first cycle before the valves switch from internal evaporator (24), which absorbs heat from precipitating tank solution to the external evaporator (25), which absorbs heat from the ambient, the temperatures of the processing tanks (respectively) are: 32 degrees F. on the cold side and 95 degrees F. on the hot side. Therefore, at the beginning of the second cycle the temperature differential between the two tanks is 63 degrees, and the temperature differential in the second phase of the cycle, when the heat is taken from the air absorbed by the external evaporator coil (25), and transferred to the dissolving tank, the ambient temperature of the air is 72 degrees, the condenser will transfer heat from the ambient air to the solution until the solution is heated to 140 degrees F. This increase from 72 degrees to 140 F makes this a 68 degree temperature differential, maintaining a high coefficient of performance for the heat pump. At this point, the processing tanks are at 32 degrees F. and 140 degrees respectively. The hot side tank (21) started with precipitated salt settled at the bottom of the tank and could not dissolve the salt until the intermediate solution at 281 g per 100 g of H2O was heated to 140 degrees. The 159 grams of precipitate settled at the bottom of the dissolving tank reconstitutes with the solution to total 440 grams of AgNO3 in 100 grams of water. Likewise, in the cold side the intermediate solution starts at 281 grams at 72 degrees and is cooled to 32 degrees F. The cooled AgNO3 solution is at 122 g per 100 grams of water. The unit at this point has two options:

Option 1: Drain each tank immediately. The cold side will open automatic valve (30) and close automatic valve (32) thereby heating the cold solution with ambient air, warming the solution while simultaneously cooling the surrounding environment (since the precipitate stays in the precipitating tank, heating the solution does not change the solution concentration). The hot tank solution will close automatic valve (33) and open automatic valve (31) to prevent the heat absorber (35) from dissipating heat to the environment, as this heat is necessary for preventing premature precipitation of the salt dissolved in the hot solution, as it is critical for the solution concentration differential to remain high before entering the RED/PRO unit.

The two solutions pass through a manifold system (36). This manifold system detects temperature differences between the two fluids, as the processing tanks alternate roles each cycle to allow the precipitated salt in the cold tank to be dissolved again by redesignating it the hot tank, the manifold system must alternate the direction of the liquids to ensure the hot concentrated liquid will consistently enter the designated concentrated solution buffering tank (38), and the cold diluted liquid will consistently enter the dilute solution buffering tank (37). The purpose of the buffering tanks is to provide a continuous supply of dilute and concentrated solution to the RED, as the processing tanks require time to heat and cool the intermediate solution, in order to manipulate the specific concentrations required in each tank respectively. From the hot buffering tank (38), the hot solution enters the RED through pipe (2) and from the cold buffering tank (37) the solution enters the RED from pipe (3).

Option 2: After the processing tanks have achieved their temperature differentials of 32 degrees Fahrenheit on the cold side dissolving tank (20) and 140 degrees F. on the hot side, the heat pump is deactivated and refrigerant movement is halted. In the hot tank (21), pump (28) is activated and begins pumping concentrated solution to a heat exchanger, which absorbs heat from a heat source beyond the operating temperature of the heat pump. This source heat can be virtually any temperature, however, the solution will be limited to the amount of precipitate available for use, and the precipitate on the cold diluted side is 159 grams per 100 grams of H2O. When the hot side solution (dissolving tank) is heated to 181.4 degrees F., the precipitate in the cold diluted side that has settled to the bottom of the tank (20) will be pumped over to the hot side when centrifugal pump (39) is activated and automatic valve (40) is open, to pump over the precipitate and produce a final concentration of 159+440, or 599 grams per 100 grams of water at a temperature of 181.4 degrees F. After this ancillary heating process, Option 1 is then initiated identically.

Figure 2:
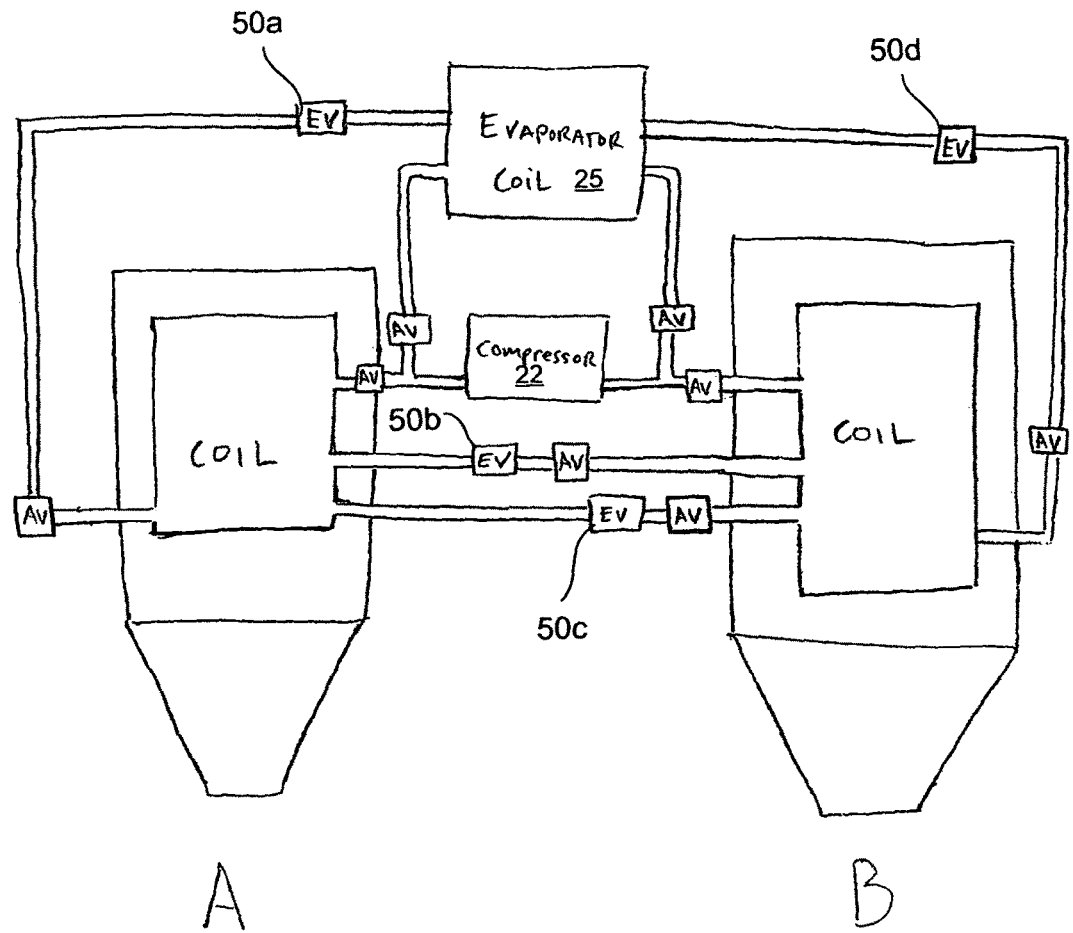
FIG. 2 is an illustration of the use of the manifold system pathways showing the different flow directions for refrigerant within the two evaporator coils, the expansion valves, the condenser coil, and how these components interconnect to the refrigerant compressor.

Referring to FIG. 2, a processing tank and refrigeration sub system is provided in accordance with one embodiment of the present invention.

Figure 2A:
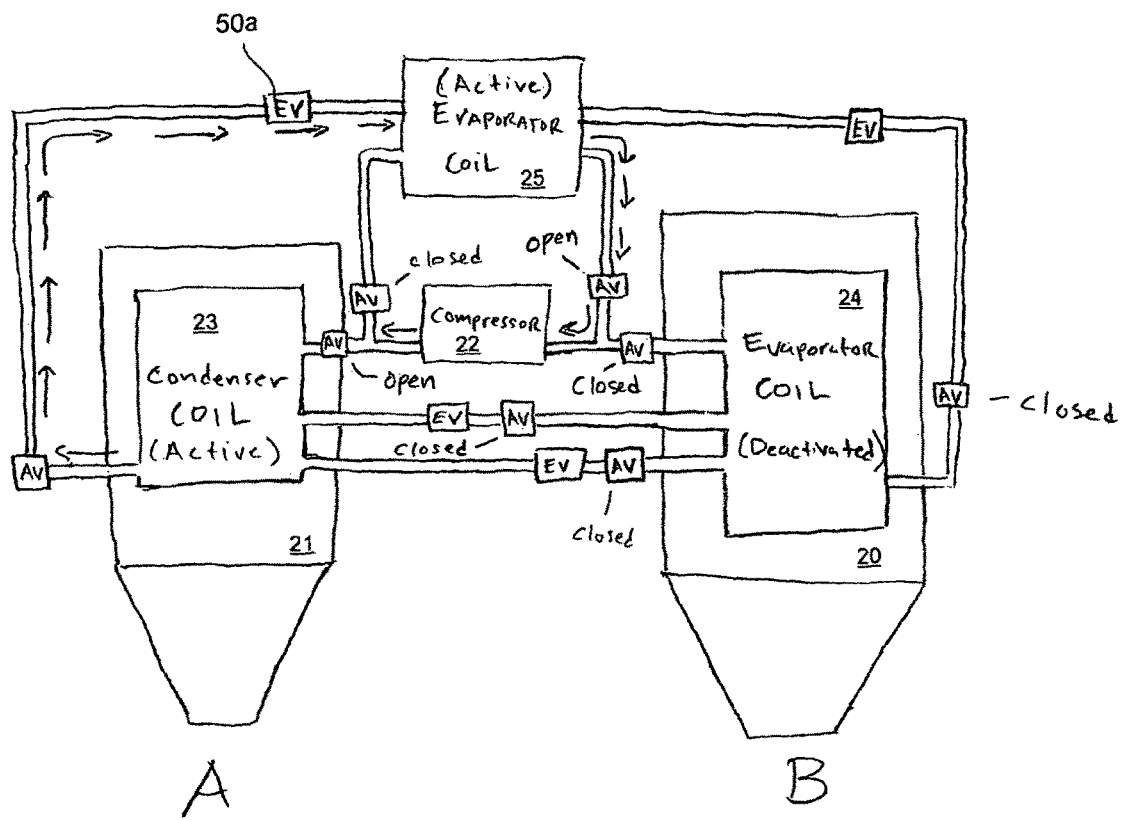
FIG. 2A is a diagram illustrating a phase in the thermodynamic cycle of the present invention, wherein heat is pumped from a cold side tank and transferred to a hot side tank.

FIG. 2A is a diagram illustrating a phase in the thermodynamic cycle of the present invention, wherein heat is pumped from a cold side tank and transferred to a hot side tank.

Figure 2B:
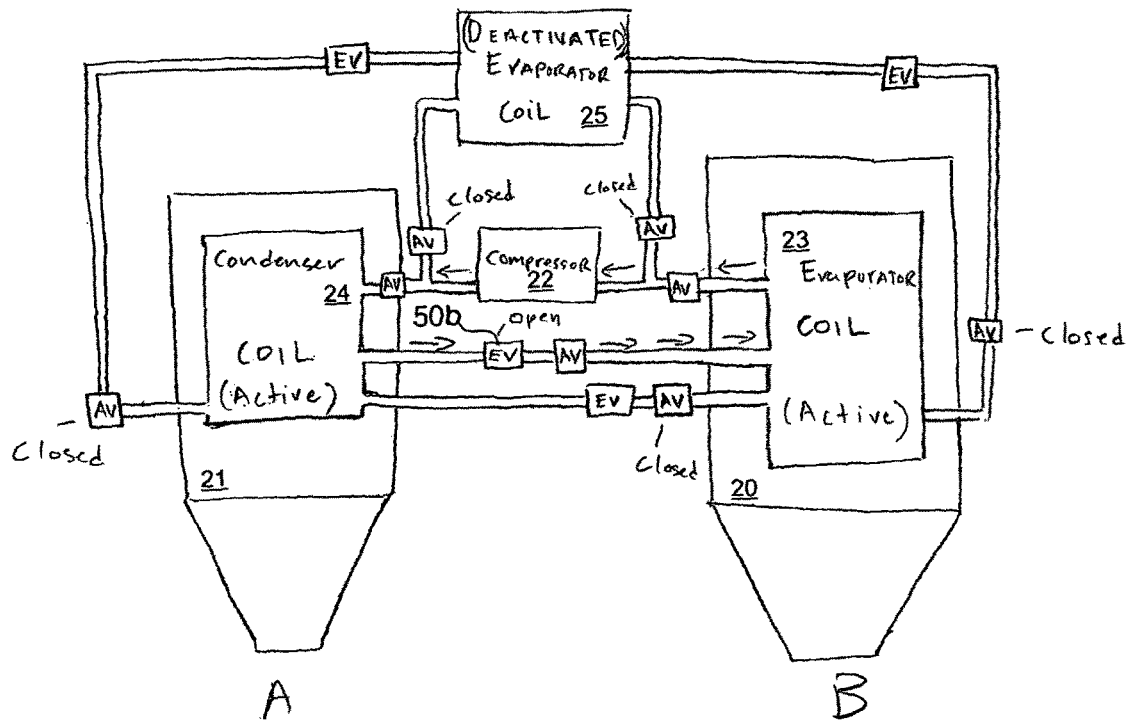
FIG. 2B is a diagram illustrating a phase in the thermodynamic cycle of the present invention, wherein the heat is pumped from the ambient environment and transferred to a hot side tank.

FIG. 2B is a diagram illustrating a phase in the thermodynamic cycle of the present invention, wherein the heat is pumped from the ambient environment and transferred to a hot side tank.

Figure 2C:
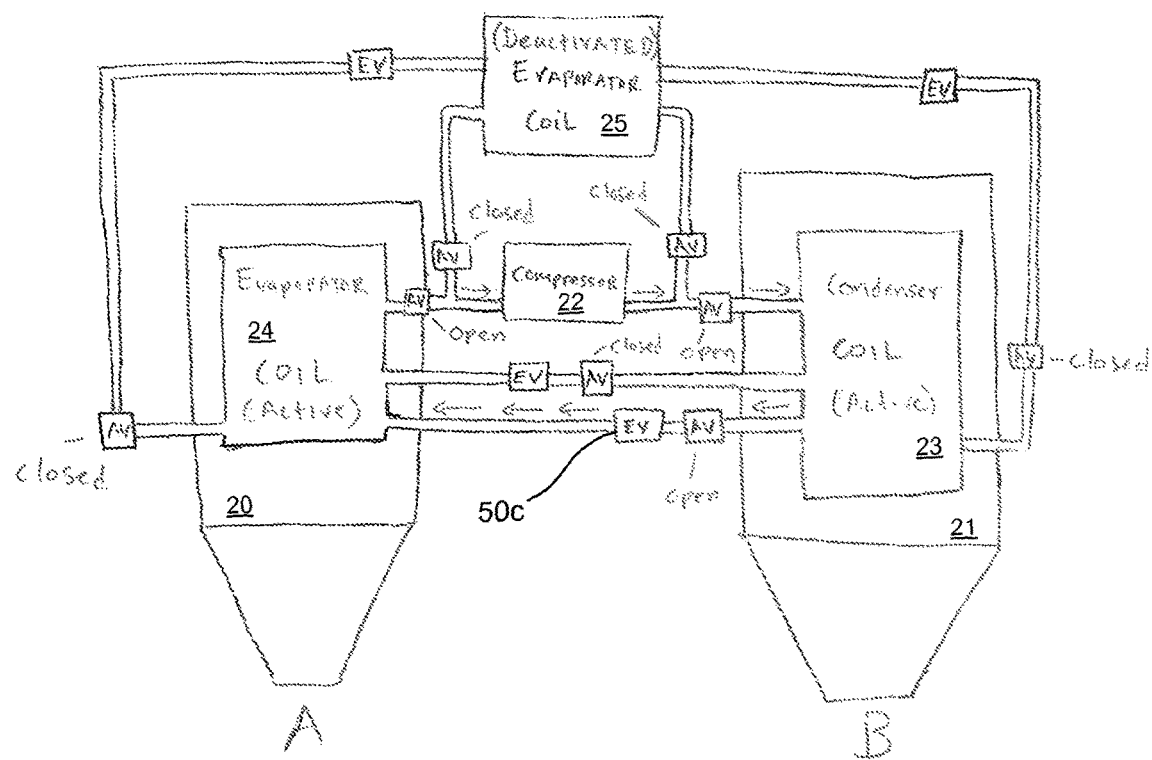
FIG. 2C is a diagram illustrating a phase in the thermodynamic cycle of the present invention, wherein the functions of the tanks are switched from previously hot side to cold side and previously cold side to hot side, and heat is pumped from the newly switched cold side tank and transferred to the newly switched hot side tank.

FIG. 2C is a diagram illustrating a phase in the thermodynamic cycle of the present invention, wherein the functions of the tanks are switched from previously hot side to cold side and previously cold side to hot side, and heat is pumped from the newly switched cold side tank and transferred to the newly switched hot side tank.

Figure 2D:
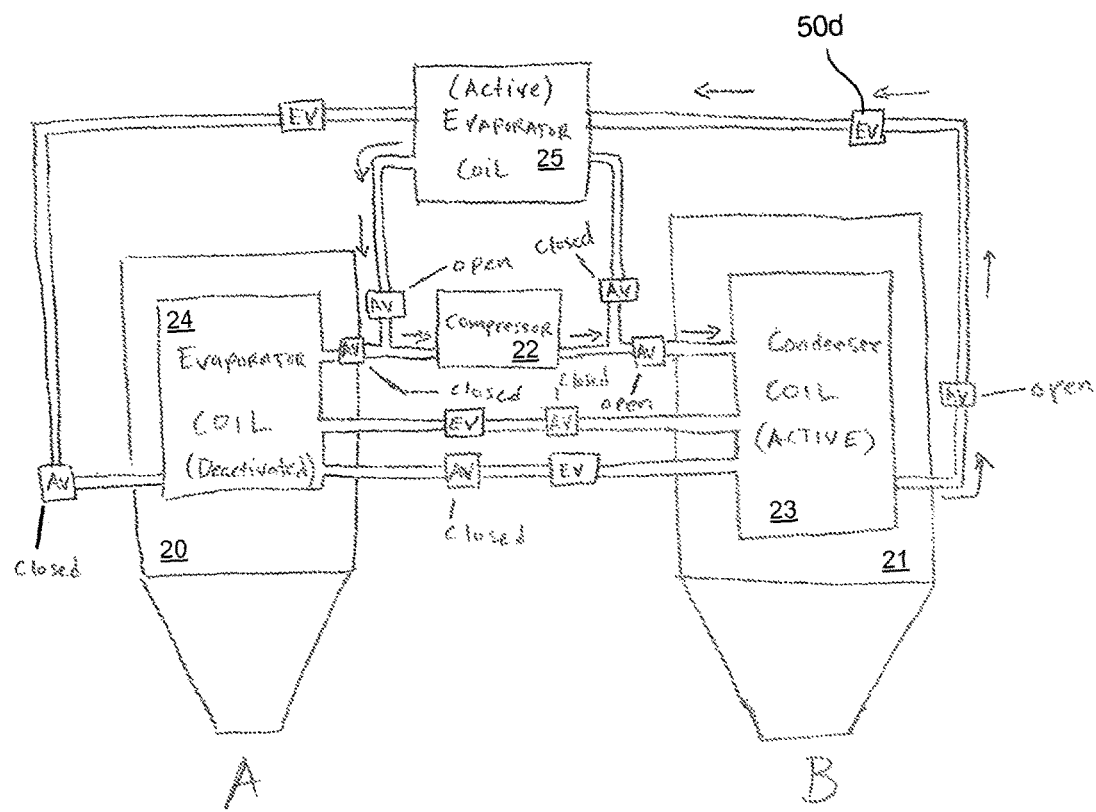
FIG. 2D is a diagram illustrating a phase in the thermodynamic cycle of the present invention, wherein the functions of the tanks are switched from previously hot side to cold side and previously cold side to hot side, and heat is pumped from the ambient environment and transferred to the newly switched hot side tank.

FIG. 2D is a diagram illustrating a phase in the thermodynamic cycle of the present invention, wherein the functions of the tanks are switched from previously hot side to cold side and previously cold side to hot side, and heat is pumped from the ambient environment and transferred to the newly switched hot side tank.

Figure 3:
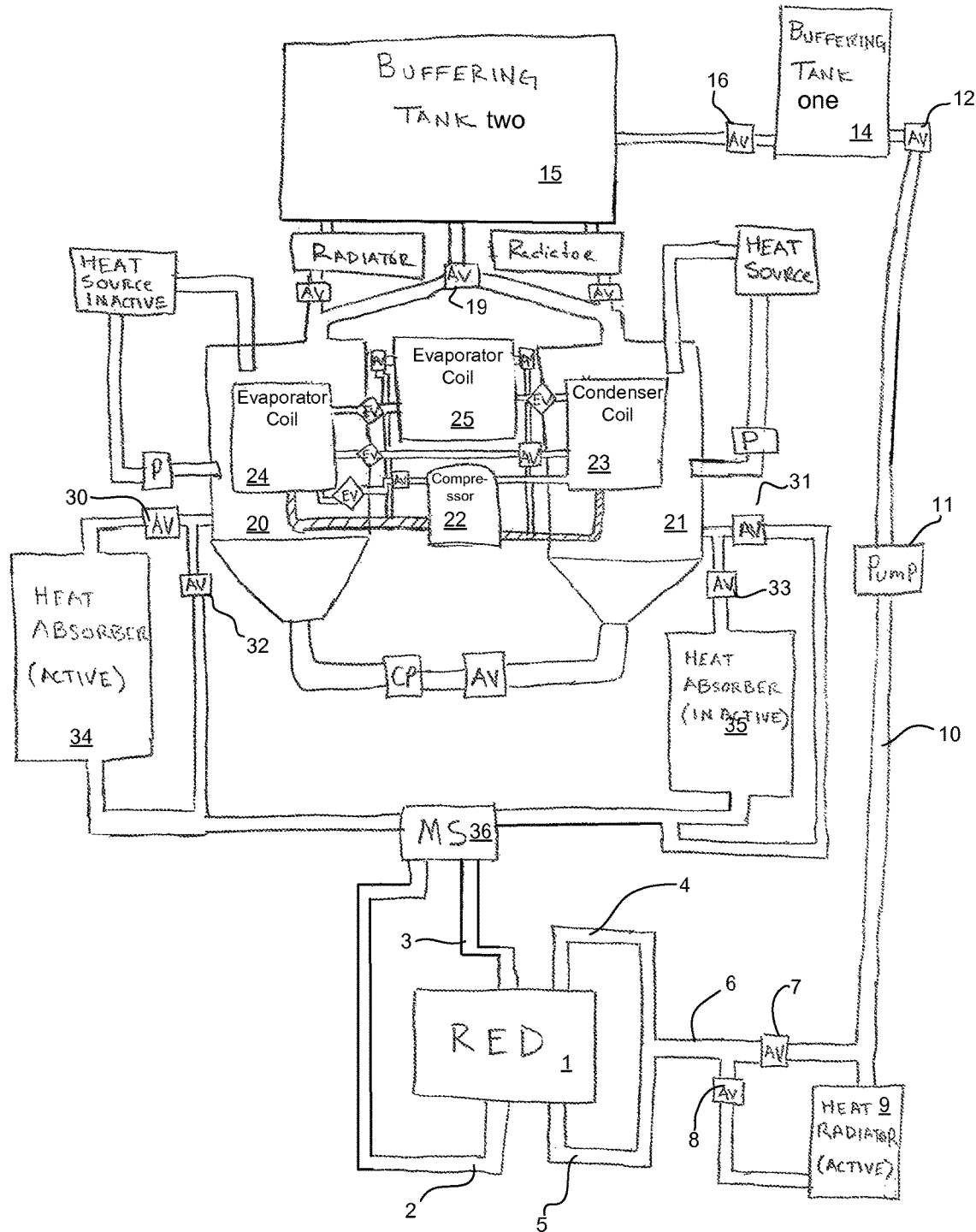
FIG. 3 illustrates an embodiment having external heat sources and a precipitate transfer line increasing the salinity difference.

In a variant, referring to FIG. 3, a system for air cooling in accordance with the present invention operates without the use of buffering tanks (37, 38). Manifold system pathways along with flow directions for refrigerant within the two evaporator coils, expansion valves, condenser coil, connect to the refrigerant compressor.

Figure 4:
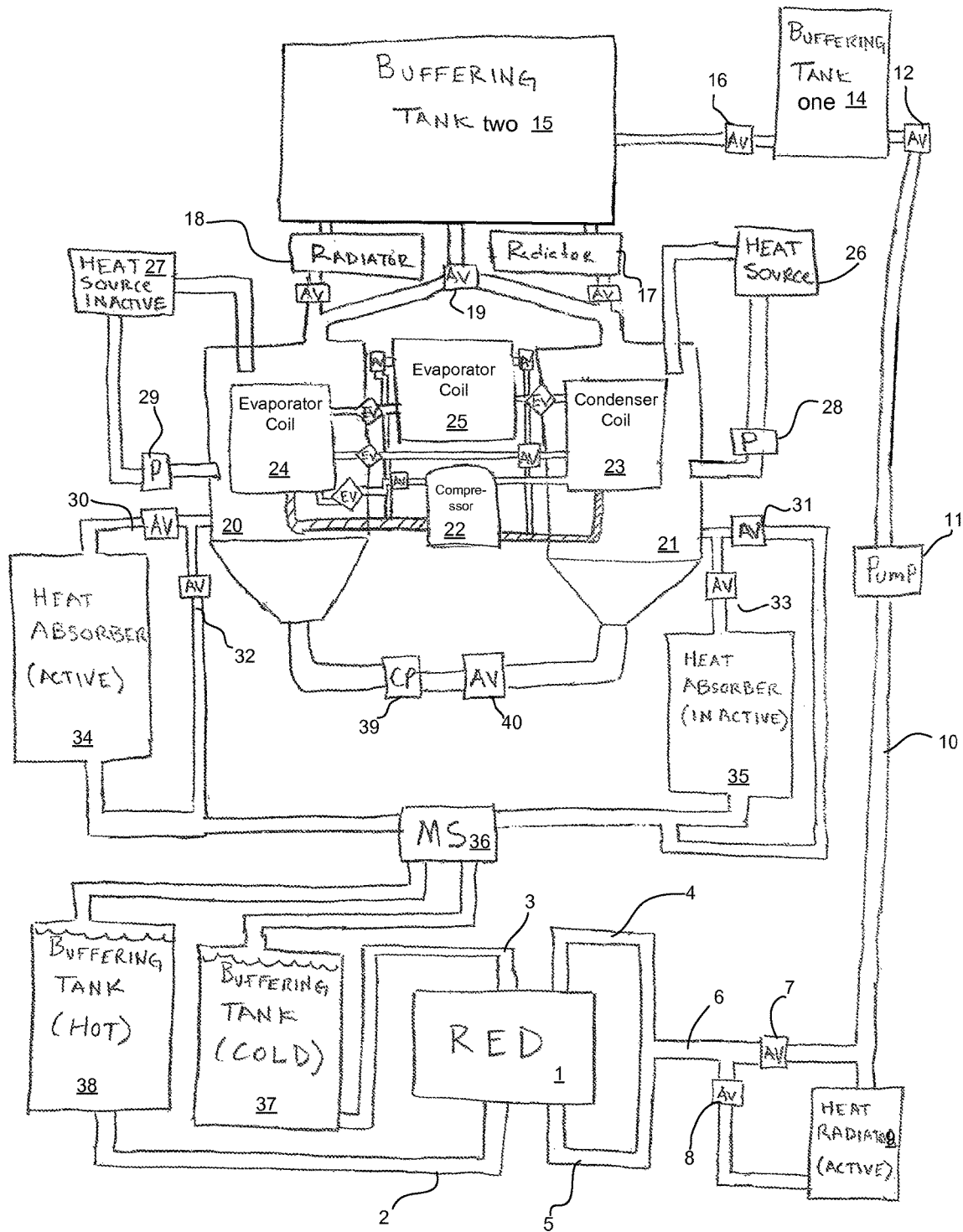
FIG. 4 is an illustration of a more efficient fluid flow system utilizing a back-up buffering tank with a heat exchanger loop, and two additional designated hot and cold buffering tanks which do not switch sides (hot to cold; cold to hot) located between the processing tanks and the RED or PRO unit, the purpose is to store hot-concentrated and cold-diluted solutions created via the processing tanks, and allow a continuous supply of solution to the RED/PRO system during the dwell time required to heat, and cool the intermediate solution to form the concentrate and dilute solutions within both the heated and cooled processing tanks, before the two solutions have achieved the salinity differential required for a proper RED/PRO electrical production cycle can be initiated.

In a variant, FIG. 4 is an illustration of a more efficient fluid flow system utilizing a back-up buffering tank with a heat exchanger loop, and two additional processing buffering tanks which do not switch sides (hot to cold; cold to hot) located between the processing tanks and the reversed-dialysis unit, the purpose is to store hot-concentrated and cold-diluted solutions created via the processing tanks, and allow a continuous supply of solution to the RED system during the dwell time required to heat, and cool the intermediate solution to form the concentrate and dilute solutions within both the heated and cooled processing tanks, before the two solutions have achieved the salinity differential required for proper RED electrical production cycle to be initiated.

In another variant, the system uses a pressure retarded osmosis generator (PRO) and entry lines (2, 3) feed a PRO.

In a further variant, a salinity differential heat engine, has a heat pump which serves as the primary heat source for the engine and the heat pump establishes a temperature differential between two working fluid solutions.

In yet another variant, a closed loop thermodynamic cycle for yields a high thermodynamic efficiency in heat to energy conversion with a low temperature differential between high and low temperature sides, wherein the cycle yields a net ambient temperature cooling effect by directly or indirectly converting ambient environmental low grade heat to electricity or potential kinetic energy or mechanical work.

In still a further variant, the system comprises a salinity differential heat engine in which heat energy is converted to kinetic or electrical energy via one of pressure retarded osmosis, pressurized gas through volume confinement, and reversed electro dialysis.

In a variant, a method is provided comprising operating a heat engine using a heat pump to extract and convert low grade heat sources into useable work (kinetic energy or electricity) in order to achieve at least a 90% thermal efficiency of the heat engine.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skilled in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the invention may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed across multiple locations.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A contained system ionic air cooling device, comprising:
    (a) an intermediate ionic solution located in at least one buffering tank associated with a heat pump;
    (b) a hot-side processing tank containing a concentrated ionic solution at a temperature of no less than 140 degrees F., associated with at least one of heat exchangers, automatic-flow-valves, heat pumps; and
    (c) a cold-side processing tank, containing a diluted ionic solution having a reversible-vapor-compression pump with a coefficient of performance of at least 3 or above having a temperature no less than 33 degrees F., associated with at least one of heat exchangers, automatic-flow-valves, heat pumps, and a refrigerant compressor cycle, and passing this diluted solution through a reversed-electro-dialysis unit or PRO unit.

2. The device according to claim 1, wherein the device is configured to first pass a recycled intermediate solution through at least one buffering tank associated with at least one heat exchange loop, before entering the cold-side processing tank.

3. The device according to claim 1, wherein the device is configured to first pass recycled ionic solutions through a buffering tank which empties when filled through an automatic-flow-valve associated with the ionic solution passing into two processing tanks, the automatic-flow-valve associated with a heat pump refrigerant configured to switch a direction of the refrigerant within a heat pump loop, changing a designation of each of the processing tanks from the hot-concentrated to the cold-diluted side each time the recycled ionic solution completely refills the buffering tank.

4. The device according to claim 1, wherein the device is configured to generate said ionic solutions are in an aqueous solution of silver-nitrate (AgN03) or ammonium-nitrate (NH4N03) at concentrations of 440 grams AgN03 in 100 grams of H20, and 122 grams of AgN03 in 100 grams of H20, respectively.

5. The device according to claim 1, wherein the reversed-electro-dialysis unit further comprises membrane structures selected from one of: Fumasep models fks 30 and fad 30 and fab 30.

6. The device according to claim 1, wherein the reversed-electro-dialysis unit further comprises electrode units selected from a group of iridium-oxides and titanium-niobium coatings and K4Fe(CN)6 and K3Fe(CN)6 (Potassium-Iron (II & III) HexacyanoFerrate) rinses contained within electrode units.

7. The device according to claim 1, further comprising a passageway for sediment created from the cooling of the diluted solution pumped through an automatic-flow-valve, activated at a predetermined temperature, the device configured to pass the sediment to the hot-side concentrated settling tank, dissolving said sediment into the hot-side concentrated solution.

8. The device according to claim 7, wherein the hot side concentrated settling tank is coupled to an external heat source causing a solution in excess of 140 degrees F. to enter the contained ionic system, and the device configured to:
- to deposit said sediment into a super-hot settling tank that is associated by a sediment drain line with the cold-side settling tank,
- resolving outstanding sediment in the cold-side tank and drain line;
- recycling the sediment for further use; and
- increase the total potential energy stored in the solution of the system.

9. The device according to claim 1, further comprising two or more reversed-electro-dialysis units, each of which is associated with a different ionic salt compound with differing enthalpies of solution, one of which can be exothermic and another endothermic, each reversed-electro-dialysis unit being included within its own contained system of said buffering tanks, processing tanks, and heat exchangers.

* * * * *